(12) United States Patent
Joyce

(10) Patent No.: US 10,086,535 B2
(45) Date of Patent: Oct. 2, 2018

(54) ADDITIVE MANUFACTURING DEVICE WITH SLIDING PLATE AND PEELING FILM

(71) Applicant: B9Creations, LLC, Rapid City, SD (US)

(72) Inventor: Michael Joyce, Deadwood, SD (US)

(73) Assignee: B9Creations, LLC, Rapid City, SD (US)

( * ) Notice: Subject to any disclaimer, the term of this patent is extended or adjusted under 35 U.S.C. 154(b) by 286 days.

(21) Appl. No.: 14/720,461

(22) Filed: May 22, 2015

(65) Prior Publication Data

US 2016/0107340 A1 Apr. 21, 2016

Related U.S. Application Data

(60) Provisional application No. 61/974,366, filed on Apr. 2, 2014.

(51) Int. Cl.
*B29C 64/223* (2017.01)
*B29C 64/129* (2017.01)
*B29C 33/68* (2006.01)

(52) U.S. Cl.
CPC ............ *B29C 33/68* (2013.01); *B29C 64/129* (2017.08); *B29C 64/223* (2017.08); *B29K 2827/18* (2013.01)

(58) Field of Classification Search
None
See application file for complete search history.

(56) References Cited

U.S. PATENT DOCUMENTS

| | | | | |
|---|---|---|---|---|
| 5,447,822 A * | 9/1995 | Hull | ................... | B29C 67/0066 264/401 |
| 2013/0068158 A1* | 3/2013 | Nitschke | ................. | B05C 11/00 118/258 |
| 2013/0270746 A1* | 10/2013 | Elsey | .................. | B29C 35/0805 264/447 |
| 2015/0183168 A1* | 7/2015 | Liverman | ........... | B29C 67/0088 264/401 |

* cited by examiner

*Primary Examiner* — Jeffrey M Wollschlager
*Assistant Examiner* — Armand Melendez
(74) *Attorney, Agent, or Firm* — Terry M. Sanks, Esq.; Beusse Wolter Sanks & Maire, PLLC

(57) ABSTRACT

Devices, systems and methods are disclosed which facilitate reduction of separation forces in additive manufacturing devices, thereby enabling creation of higher resolution parts. In an aspect, an additive manufacturing device utilizing a photopolymer comprises a vat holding photocurable resin, a build platform movable in a vertical direction and an image source which selectively projects part cross sections into the vat in order to polymerize the resin and form a part in a layer-wise fashion. The image area of the vat is formed by a transparent film, such as Teflon FEP film, stretched under tension. A horizontally slideable shutter is slideable between the film and the imager, providing support for the film when needed.

20 Claims, 7 Drawing Sheets

ADDITIVE MANUFACTURING DEVICE WITH SLIDING PLATE AND PEELING FILM

CROSS REFERENCE TO RELATED APPLICATION

This application claims the benefit of U.S. Provisional Patent Application Ser. No. 61/974,366 filed Apr. 2, 2014, and entitled "Additive Manufacturing Device with Sliding Plate and Peeling Film," the entire contents of which are incorporated herein by reference.

FIELD OF THE DISCLOSURE

The present disclosure generally relates to additive manufacturing devices and more particularly to improvements in separating cured layers from the build area.

BACKGROUND

The statements in this section merely provide background information related to the present disclosure and may not constitute prior art.

Additive manufacturing devices produce three-dimensional parts by sequentially adding materials in a pattern. Some classes of additive manufacturing devices produce polymer parts solidified from a photopolymer resin which has been exposed in a layer-wise fashion to electromagnetic radiation generated by a light source such as a projector. The light source projects a cross sectional image into a build area, solidifying a layer of photopolymer resin into a hardened layer, thereby adding another layer to the object being formed. In order to create parts with a high degree of detail and accuracy, removing the hardened layer from the build area without deforming, destroying, or otherwise damaging the layer or other portions of the part is essential.

When the layer is formed, the newly-formed layer often adheres to an image surface found in the build area. Two types of forces prevent separation at the interface between the image surface and the newly-formed layer: (1) the adhesion force between the image surface and the newly-formed layer; and (2) a vacuum force present between planar objects in a fluid. The adhesion force is comprised of chemical bonding forces between the image surface and the newly-forced layer. In some embodiments, the adhesion force also comprises mechanical adhesion forces between the image surface and the newly-formed layer. In order to separate the part from the image surface and continue assembling it, a separation force must be applied in order to overcome the adhesion and vacuum forces present. Application of the separation force stretches and strains the part being formed in non-uniform, undesirable ways. In some cases, the separation force is strong enough to distort or destroy fragile portions of a part because the fragile portion is stretched, strained, and even completely separated from the part as the part is repositioned to form the next layer of the part. Because this separation force destroys or damages fine detailing in a desired part design, resolution has been limited. Parts containing, for example, very thin segments or intricate detailing (e.g. channels, tubing, etc.) cannot be produced, are produced with an extremely high failure rate, or must be produced at a very slow rate using different photopolymers in order to produce a part containing fragile sections that will not deform when exposed to the separation forces.

Some additive manufacturing devices utilize a thin film as the build surface or image surface. Such films include Teflon® films (available from Du Pont Co. of Wilmington, Del.) or other non-stick materials. The film may also be a flexible polyurethane or other material. Such devices struggle to ensure a uniform distribution of material to create subsequent layers during the build process.

Given the foregoing, what is needed are devices, systems and methods which facilitate creating a part via additive manufacturing wherein separation forces are reduced. Furthermore, providing a constant, uniform layer of photopolymer resin to form subsequent layers from is desired.

SUMMARY

This Summary is provided to introduce a selection of concepts. These concepts are further described below in the Detailed Description section. This Summary is not intended to identify key features or essential features of this disclosure's subject matter, nor is this Summary intended as an aid in determining the scope of the disclosed subject matter.

In an aspect, an additive manufacturing device comprises a vat holding photocurable resin, a build platform movable in a vertical direction and an image source which selectively projects part cross sections into the vat in order to polymerize the resin and form a part in a layer-wise fashion. The image area of the vat is formed by a transparent film, such as Teflon FEP film, stretched under tension. A first layer is produced by projecting a cross section onto the image area, hardening a layer of photopolymer between the film and the build platform. The build platform is raised a distance greater than one layer height, thereby removing the first layer from the film via peeling away. After the first layer is elevated, liquid resin flows in, providing a new quantity of uncured resin for subsequent layer formation. A horizontally movable shutter slides between the film and the imager, providing a support for the film. The build platform is then lowered into a position one layer height away from the film, expelling any excess liquid resin while providing sufficient material to for the subsequent layer to be cured. The shutter is then retracted and a cross section of the subsequent layer is projected onto the image area, hardening the subsequent layer. This process is repeated until the part is completed.

This method eliminates the undesirable "vacuum" effect during the lifting process that is inherent when supporting a film with a transparent plate. To do this, the shutter is slideable under the film to support it when the part is lowered into position. After the lowering, the shutter slides away, allowing the next exposure. Additionally, the shutter may be used to block exposure while the imager is being prepared for the subsequent exposure. A rigid transparent member may be positioned between the film and the shutter in order to provide additional support for the film.

Devices, systems and methods in accordance with the present disclosure enable reduced separation force and therefore enable higher resolution additive manufacturing devices by eliminating the vacuum effect between the. film and the support plate. If the support plate is present during imaging, the support plate is slidably moved from underneath the film after a layer is exposed, leaving no surface for the film to adhere to on one side.

Further features and advantages of the present disclosure, as well as the structure and operation of various aspects of the present disclosure, are described in detail below with reference to the accompanying drawings.

BRIEF DESCRIPTION OF THE DRAWINGS

The features and advantages of the present disclosure will become more apparent from the Detailed Description set forth below when taken in conjunction with the drawings in which like reference numbers indicate identical or functionally similar elements.

FIG. 7 is a flowchart illustrating an exemplary process for forming a part layer 106 using additive manufacturing device 100 of FIG. 3; and.

DETAILED DESCRIPTION

The present disclosure is directed to devices, systems, methods, and computer program products which facilitate consistent curing across a part layer of a part being constructed via an additive manufacturing device.

In an aspect, each element of the part layer is exposed to light from a light source until the element receives sufficient energy to cure. The amount of received energy is calculated based on both the light received directly from the light source and light received from surrounding elements due to dispersion and other effects.

Figure 1:
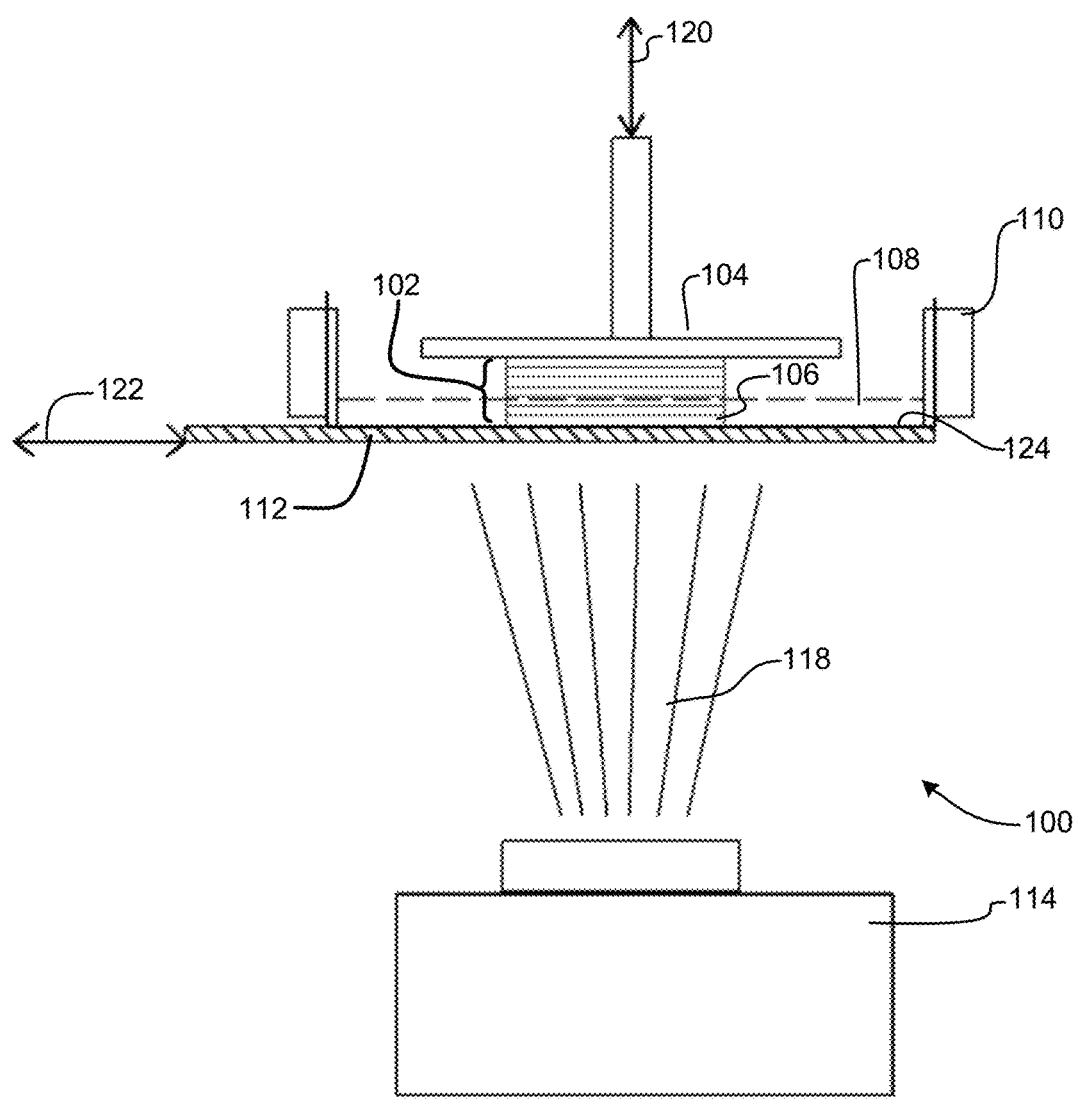
FIG. 1 is a schematic side view of an additive manufacturing device having an opaque sliding shutter, the shutter being in a supported position, according to an aspect of the present disclosure.

Referring now to FIG. 1, a schematic side view of an additive manufacturing device 100, according to an aspect of the present disclosure, is shown.

Additive manufacturing device 100 constructs a part 102 by curing photopolymer resin 108 via exposure to electromagnetic radiation 118, or curing energy, from a light source 114. Light source 114 projects light 118 into a build area in a pattern which causes a photopolymer layer 106 to harden into a new portion of part 102, thereby constructing part 102 in a layer-wise fashion. During construction, part 102 is attached to build table 104 or build platform. Build table 104 is configured to support part 102 as part 102 is being constructed. Build table 106 may comprise a planar, movable surface attached to a z-axis actuator 120. Z-axis actuator 120 is configured to raise part 102 in a step-wise fashion during construction such that additional layers may be added to part 102.

Additive manufacturing device 100 may comprise basin 110 or vat. Basin 110 is configured to house resin 108 and is static. A build area or imaging area where light 118 is projected forms a portion of basin bottom. In an aspect, a bottom portion of basin 110 corresponding with the build area is a transparent, tensioned film 124. Film 124 may be Teflon FEP film. In another aspect, film 124 is a polyurethane film, a flexible transparent material, a flexible translucent material, or another material apparent to those skilled in the relevant art(s) after reading the description herein. Basin 110 may comprise tensioners, clamps, or other portions which set and hold film 124 in place. In some aspects, a sealer 131 is applied around the edges of film in order to form a watertight seal between basin walls and film 124.

Figure 2:
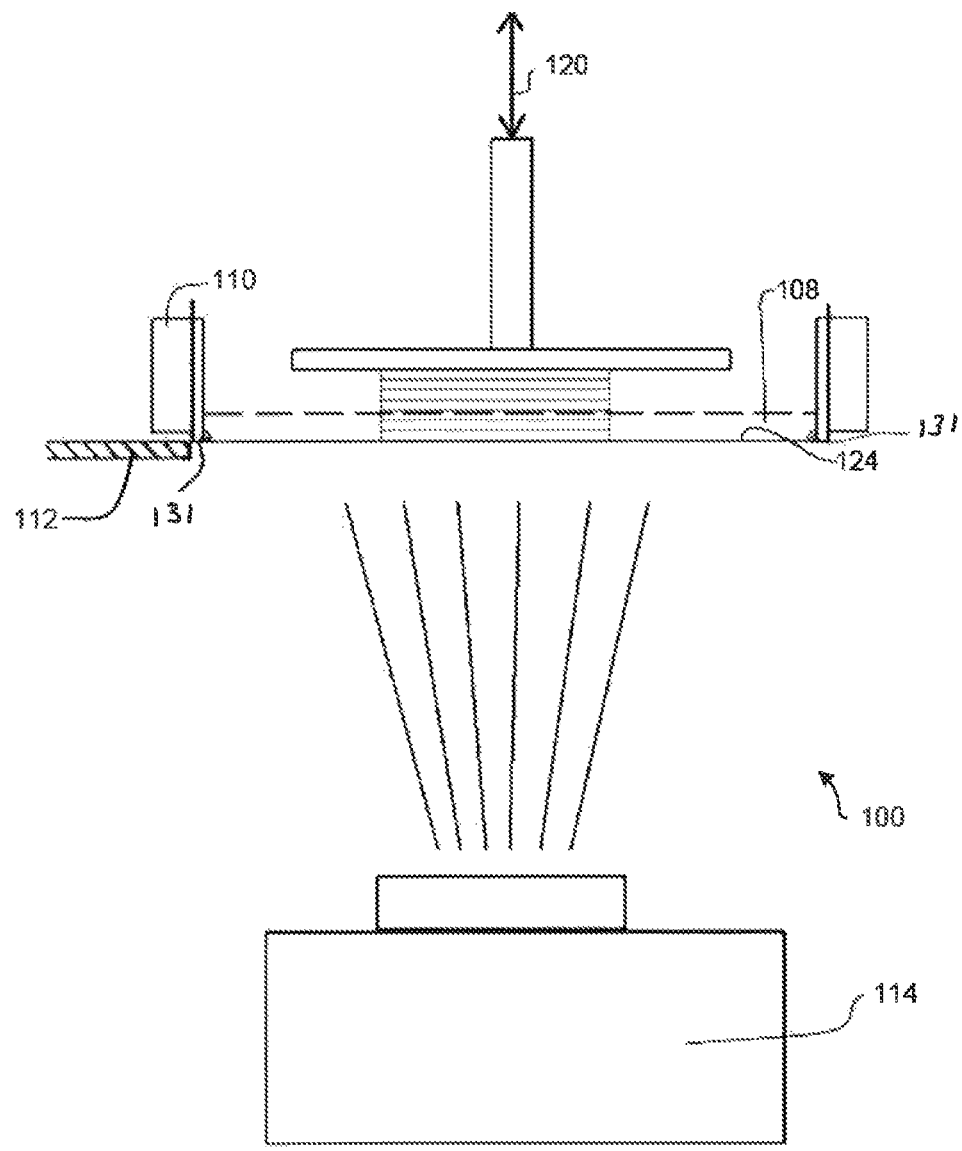
FIG. 2 is a schematic side view of the additive manufacturing device of FIG. 1, the shutter being in the unsupported position, according to an aspect of the present disclosure.
Figure 4:
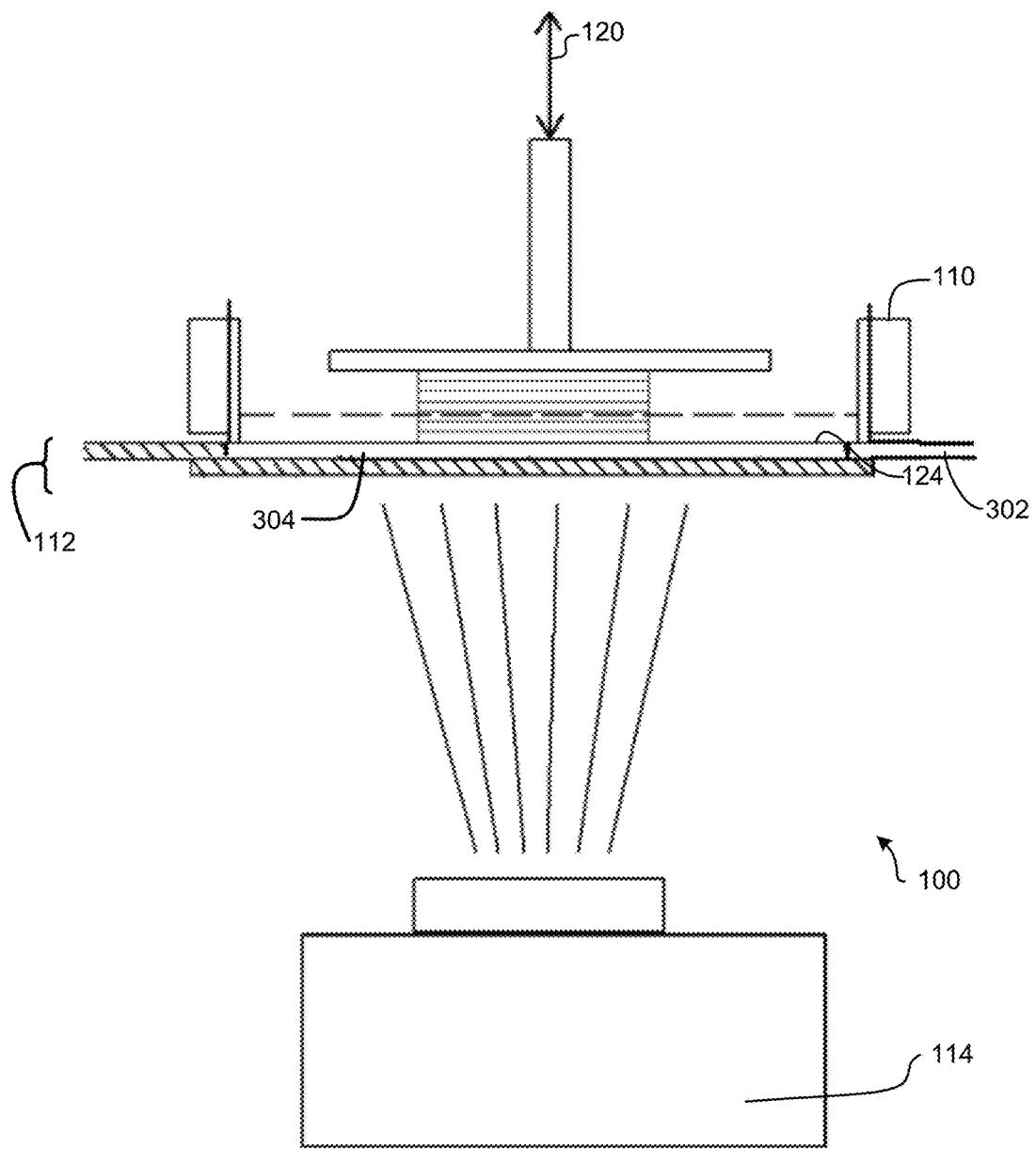
FIG. 4 is a schematic side view of the additive manufacturing device of FIG. 3, the shutter being in the unsupported position, according to an aspect of the present disclosure.

A shutter 112 is positioned adjacent to film 124. Shutter 112 is slideable between multiple positions such as an unsupported position, as shown in FIG. 1 and FIG. 4 and an unsupported position, as shown in FIG. 2. Shutter 122 is moved by Y-actuator 122. Shutter 112 may be a rigid member which contacts the underside of film 124 when in the unsupported position. Shutter 112 may be a transparent material, including materials through which light 118 may be transmitted in order to form layer 106 (e.g., glass, acrylic). Shutter 112 may also be an opaque material. Shutter 112 is configured to support film 124 and resin 108 contained in basin 110 when part is lowered or otherwise moved relative to basin 110. Additive manufacturing device 100 may further comprise a lock, receiver, or other stabilizing portion (not shown) which receives an end or side portion of shutter 112 when shutter 112 is placed in the unsupported position shown in FIG. 1 in order to stabilize and support shutter 112. The stabilizing portion may be integrated into basin 110.

Figure 5:
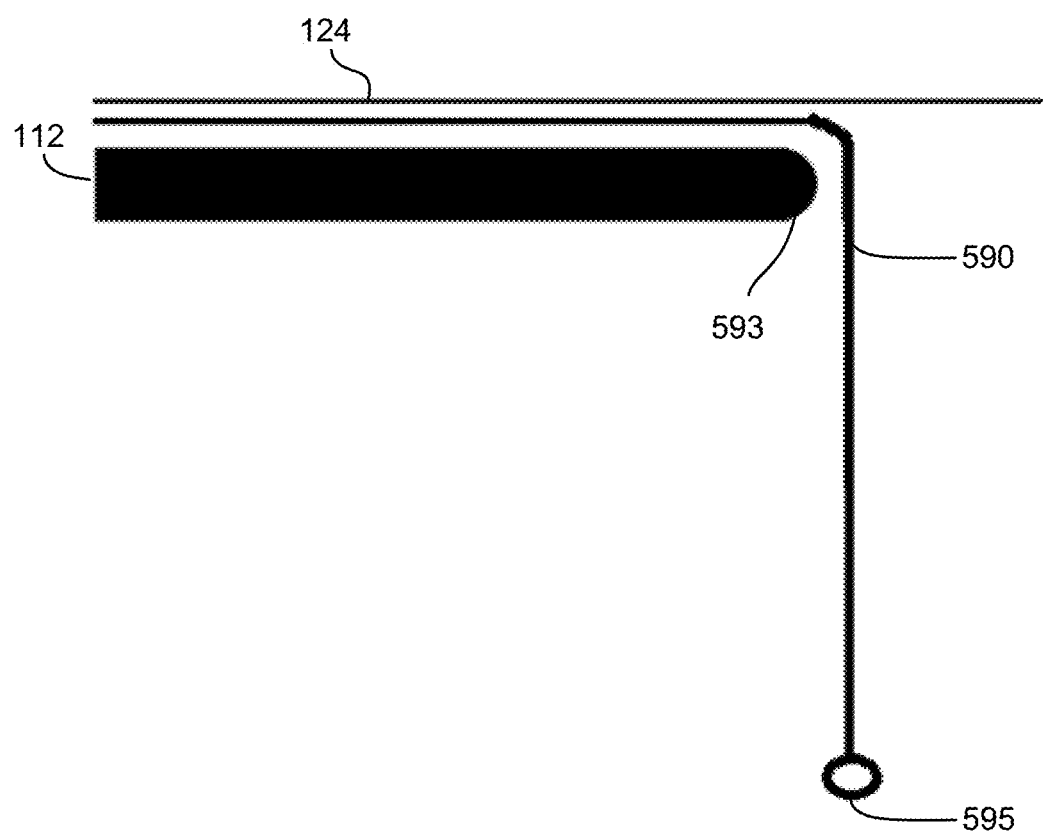
FIG. 5 is a flowchart illustrating an exemplary process for forming a part layer using the additive manufacturing device of FIG. 1, according to an aspect of the present disclosure.

In some aspects, a friction reducing element 590, as disclosed further in FIG. 5, may be positioned between film 124 and shutter 112. The friction reducing element may be a felt liner covering all of the cross section of shutter 112 which contacts film 112 when shutter 112 is in a supporting position. In another aspect, the friction reducing element is a strip of material (e.g., a felt liner, a lubricating element, polytetrafluoroethylene tapes, slick surface tape, glide tape and the like) placed along at least a portion of the perimeter of shutter (e.g., two sides, all four sides, and the like). Friction reducing element may be a lubricant such as graphite lubricant, oil-based lubricant, or the like. These lubricants may be periodically applied.

Referring now to FIG. 2, a schematic side view of additive manufacturing device 100 of FIG. 1, shutter 112 being in the unsupported position, according to an aspect of the present disclosure, is shown.

Shutter 112 may be retracted or otherwise moved in a variety of directions in order to expose resin 108 for solidification by image 114. In an aspect where shutter 112 is opaque, shutter 112 may be retracted, leaving film 124 unsupported by shutter and enabling imager to solidify layer 106 via exposing resin 108 to light 118. When shutter 112 is retracted into an unsupported position, film 124 is free to deflect up or down and is not held in place by vacuum forces between shutter 112 and film 124.

When shutter 112 is in the closed position, part 102 may be pushed against resin 108 and film 124 in order to ensure that only a chosen depth of uncured resin exists between film 124 and part 102. Where shutter is transparent, layer 106 may be formed when shutter is in the closed position (FIG. 1) or in the unsupported position (FIG. 2).

Figure 3:
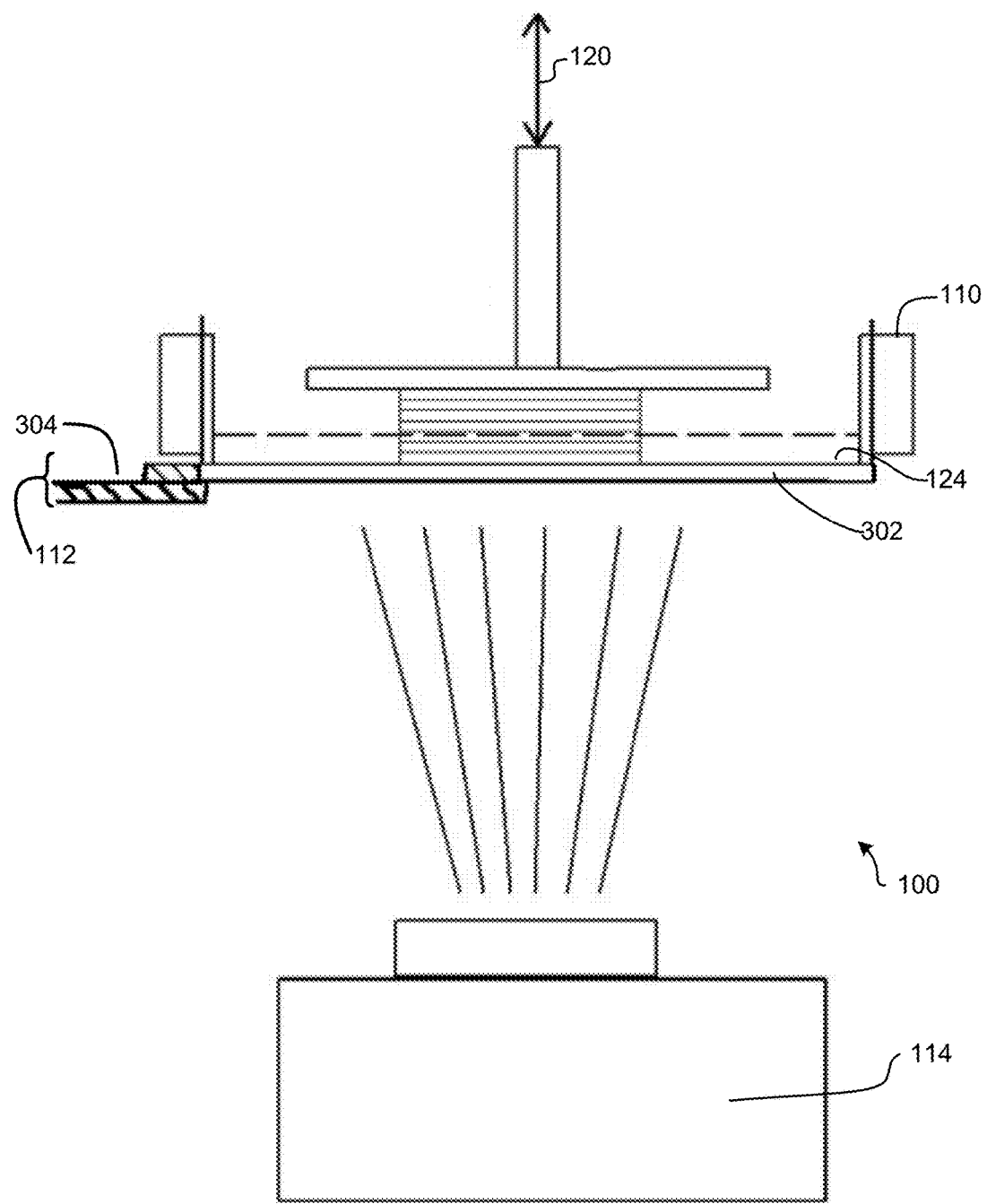
FIG. 3 is a schematic side view of an additive manufacturing device having a sliding shutter with a cutout area, the shutter being in an exposure position, according to an aspect of the present disclosure.

Referring now to FIGS. 3 and 4, schematic side views of additive manufacturing device 100 having a sliding shutter 112 with a cutout area 304, according to an aspect of the present disclosure, is shown.

Shutter 112 may be an assembly comprising a transparent window 302 and a cutout area 304 or recess. Transparent window 302 is slidably positionable adjacent to film 124. Device 100 may image a new layer 106 through transparent window 302 when window 302 is in the position shown in FIG. 3.

Cutout area 304 is a recess in shutter 112. In some aspects, cutout area 304 is sufficiently deep to allow film 124 to deflect downwardly freely. Cutout area 304 may have a cross section equal to the cross section of the build area. In other aspects, the cross section of cutout area 304 is smaller or larger than the build area. When cutout area 304 is moved under film 124, the vacuum force holding film 124 to shutter 112 is released, facilitating removable of part 102 from film 124 with a smaller separation force.

FIG. 5 shows an embodiment of a friction reducing element disclosed above. The a friction reducing element 590 may be a protective or sacrificial film, such as, but not limited to Teflon, a cloth or some other material that will have a low coefficient of friction between the friction reducing element 590 and the shutter 112. Thus, friction may occur between the friction reducing element 590 and the slideable shutter 112 wherein only the friction reducing element 590 may be damaged, such as, but not limited to being scratched. The shutter 112 applies the friction reducing element 590 to the underside of film 124 without sliding the friction reducing element 590 against film 124, thereby eliminating the possibility of scratching film 124 via relative movement with friction reducing element 590 or shutter 112. As further illustrated, an optional weight 595 or another approach to ensure that the friction reducing element 590 remains out of a path of the illuminated curing energy when the shutter 112 slides to an open for exposure position. The shutter 112 may have a transitional edge 593 to assist the friction reducing element 590 from moving when acted upon by the weight 595. Those skilled in the art will readily recognize that other approaches may be implemented to provide for removing the friction reducing element 590 from within a field of the curing energy. Therefore, the embodiment disclosed herein is not meant to be considered limiting. Since there is no sliding motion between the friction reducing element 590 and the film 124, the film 125 is not damaged.

Figure 6:
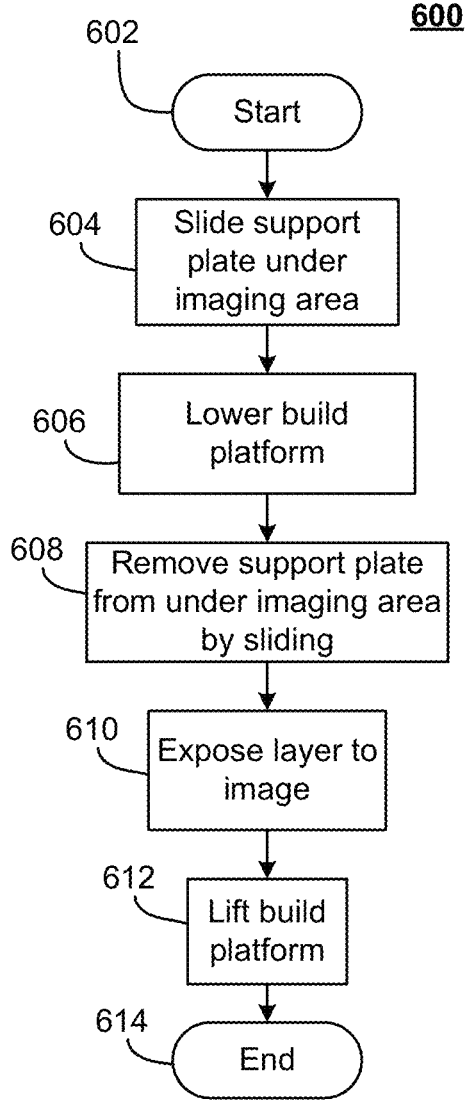
FIG. 6 is a flowchart illustrating an exemplary process for forming a part layer using the additive manufacturing device of FIG. 3, according to an aspect of the present disclosure.

Referring now to FIG. 6, a flowchart illustrating an exemplary process for forming a part layer using the additive manufacturing device of FIG. 1, according to an aspect of the present disclosure, is shown.

In an aspect, light, electromagnetic radiation, or other curing energy is projected onto a material such as liquid photopolymer resin in order to cure layer 106. Each portion of layer 106 being formed requires a given amount of energy to cure properly. Each layer 106 is cured to a specified cure depth and the amount of uncured resin 108 between part 102 and film 124 before exposure has a depth equal to or based on the desired cure depth.

Process 600, at least a portion of which may execute within computing functionality 800, utilizes device 100 to produce part 102 via layer-wise manufacturing. Each layer is cured from a photopolyermizable resin 108 after exposure to light 118 during process 600. Process 600 begins at step 602 with control passing immediately to step 604.

At step 604, shutter 112 is slidably positioned under film 124. If shutter 112 is already in this position, step 504 is omitted. Positioning of shutter 112 in this step supports film 124 and resin 108 during step 506 and assists in ensuring that a uniform layer of resin 108 is present between part 102 or build platform 104 which will be cured into newly formed layer 106 in step 610.

At step 606, build platform 104 is lowered. In an aspect, build platform 104 is lowered into vat 110 until excess resin 108 is squeezed out from between build platform 104 or attached part 102 and film 124. Film 124 is supported by shutter 112 during this step, enabling creation of a uniform layer of uncured resin 108.

At step 608, shutter 112 is moved to an exposure position, such as the position shown in FIG. 2. In step 608, the light path between build area and image 114 is cleared. If shutter 112 is transparent, this step may be omitted.

At step 610, a cross section of layer 106 to be cured is projected into build area by imager 114, curing a newly-formed layer 106.

At step 612, part 102 including newly-formed layer 106 is removed from film 124. Build platform 104 is lifted, causing film 124 to peel away from layer 106. If shutter 112 is still adjacent to film 124 at the beginning of step 612, shutter 112 is first slidably moved away from film 124, thereby eliminating any vacuum forces between film 124 and shutter 112.

Process 600 then terminates at step 614.

Figure 7:
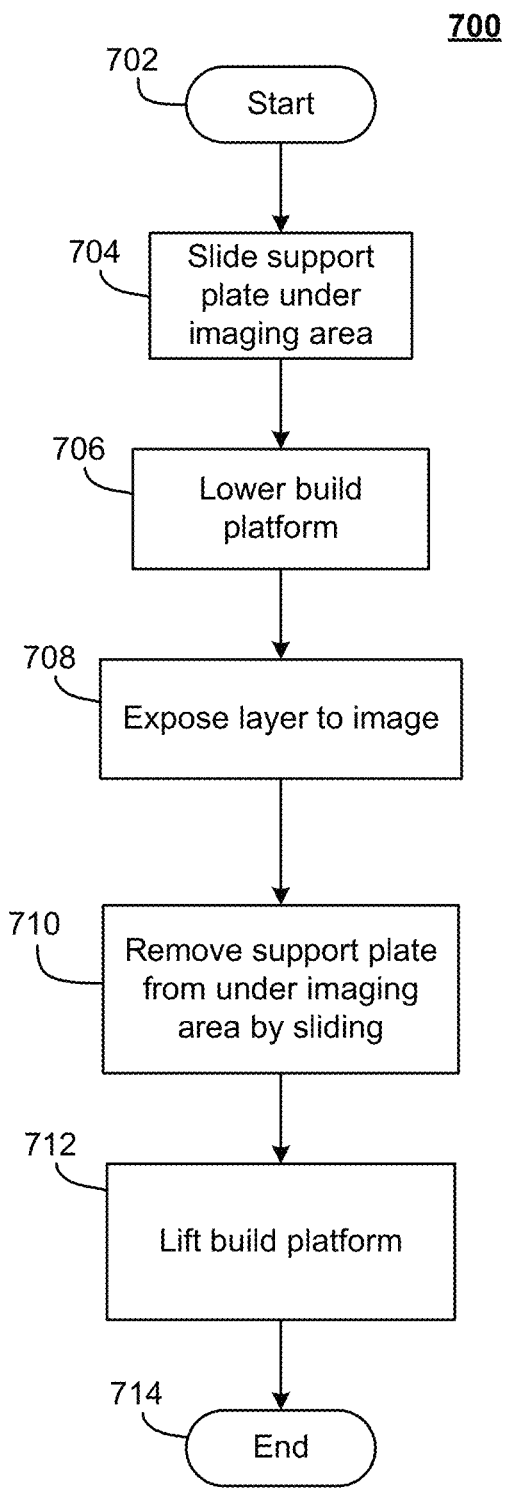

Referring now to FIG. 7, a flowchart illustrating an exemplary process for forming a part layer 106 using additive manufacturing device 100 of FIG. 3, according to an aspect of the present disclosure, is shown.

Process 700, at least a portion of which may execute within computing functionality 700, utilizes device 100 as configured in FIGS. 3 & 4 to produce part 102 via layer-wise manufacturing. Each layer is cured from a photopolyermizable resin 108 after exposure to light 118 during process 700. Process 700 begins at step 702 with control passing immediately to step 704.

At step 704, transparent window 302 is slidably placed adjacent to film 124, providing support for film 124.

At step 706, build platform 104 is lowered. In an aspect, build platform 104 is lowered into vat 110 until excess resin 108 is squeezed out from between build platform 104 or attached part 102 and film 124. Film 124 is supported by shutter 112 during this step, enabling creation of a uniform layer of uncured resin 108.

At step 708, a cross section of layer 106 to be cured is projected into build area by imager 114, curing a newly-formed layer 106.

At step 710, shutter 112 is slidably moved, positioning cutout area 304 below film 124, thereby eliminating vacuum forces between film 124 and window 302.

At step 712, part 102 is removed from film 124 via lifting build platform 104.

Process 700 then terminates at step 714.

Figure 8:
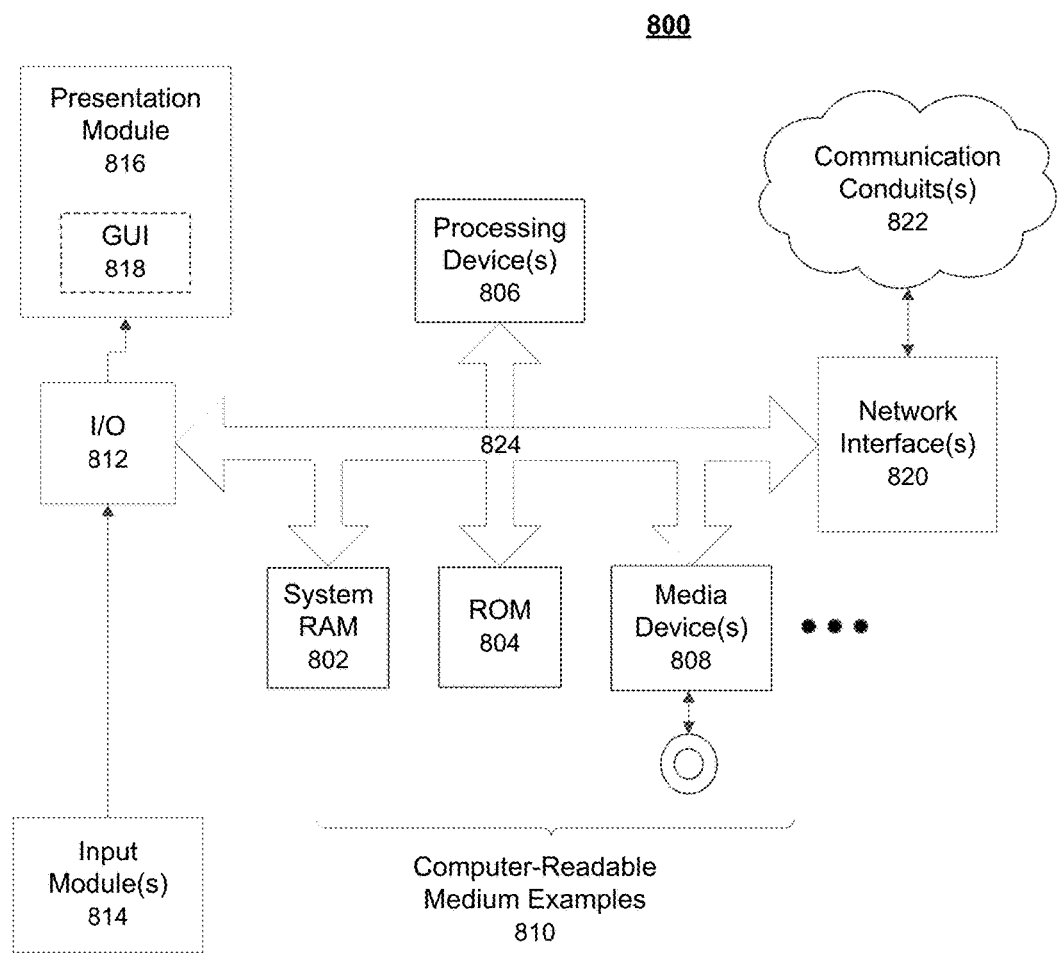
FIG. 8 is a block diagram of an exemplary computing system useful for implementing aspects of the present disclosure.
Figure 8:

Referring now to FIG. 8, a block diagram of an exemplary computer system useful for implementing various aspects the processes disclosed herein, in accordance with one or more aspects of the present disclosure, is shown.

That is, FIG. 8 sets forth illustrative computing functionality 800 that may be used within device 100, to implement processes 600 or 700, or any other component utilized herein. In all cases, computing functionality 800 represents one or more physical and tangible processing mechanisms.

Computing functionality 800 may comprise volatile and non-volatile memory, such as RAM 802 and ROM 804, as well as one or more processing devices 806 (e.g., one or more central processing units (CPUs), one or more graphical processing units (GPUs), and the like). Computing functionality 800 also optionally comprises various media devices 808, such as a hard disk module, an optical disk module, and so forth. Computing functionality 800 may perform various operations identified above when the processing device(s) 806 execute(s) instructions that are maintained by memory (e.g., RAM 802, ROM 804, and the like).

Instructions and other information may be stored on any computer readable medium 810, including, but not limited to, static memory storage devices, magnetic storage devices, and optical storage devices. The term "computer readable medium" also encompasses plural storage devices. In all cases, computer readable medium 810 represents some form of physical and tangible entity. By way of example, and not limitation, computer readable medium 810 may comprise "computer storage media" and "communications media."

"Computer storage media" comprises volatile and non-volatile, removable and non-removable media implemented in any method or technology for storage of information, such as computer readable instructions, data structures, program modules, or other data. Computer storage media may be, for example, and not limitation, RAM 802, ROM 804, EEPROM, Flash memory, or other memory technology, CD-ROM, digital versatile disks (DVD), or other optical storage, magnetic cassettes, magnetic tape, magnetic disk storage, or other magnetic storage devices, or any other medium which can be used to store the desired information and which can be accessed by a computer.

"Communication media" typically comprise computer readable instructions, data structures, program modules, or other data in a modulated data signal, such as carrier wave or other transport mechanism. Communication media may also comprise any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared, and other wireless media. Combinations of any of the above are also included within the scope of computer readable medium.

Computing functionality 800 may also comprise an input/output module 812 for receiving various inputs (via input modules 814), and for providing various outputs (via one or more output modules). One particular output module mechanism may be a presentation module 816 and an associated GUI 818. Computing functionality 800 may also include one or more network interfaces 820 for exchanging data with other devices via one or more communication conduits 822. In some embodiments, one or more communication buses 824 communicatively couple the above-described components together.

Communication conduit(s) 822 may be implemented in any manner (e.g., by a local area network, a wide area network (e.g., the Internet), and the like, or any combination thereof). Communication conduit(s) 822 may include any combination of hardwired links, wireless links, routers, gateway functionality, name servers, and the like, governed by any protocol or combination of protocols.

Alternatively, or in addition, any of the functions described herein may be performed, at least in part, by one or more hardware logic components. For example, without limitation, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The terms "module" and "component" as used herein generally represent software, firmware, hardware, or combinations thereof. In the case of a software implementation, the module or component represents program code that performs specified tasks when executed on a processor. The program code may be stored in one or more computer readable memory devices. The features of the present disclosure described herein are platform-independent, meaning that the techniques can be implemented on a variety of commercial computing platforms having a variety of processors (e.g., set-top box, desktop, laptop, notebook, tablet computer, personal digital assistant (PDA), mobile telephone, smart telephone, gaming console, and the like).

While various aspects of the present disclosure have been described above, it should be understood that they have been presented by way of example and not limitation. It will be apparent to persons skilled in the relevant art(s) that various changes in form and detail can be made therein without departing from the spirit and scope of the present disclosure. Thus, the present disclosure should not be limited by any of the above described exemplary aspects, but should be defined only in accordance with the following claims and their equivalents.

In addition, it should be understood that the figures in the attachments, which highlight the structure, methodology, functionality and advantages of the present disclosure, are presented for example purposes only. The present disclosure is sufficiently flexible and configurable, such that it may be implemented in ways other than that shown in the accompanying figures (e.g., implementation within computing devices and environments other than those mentioned herein, implementation utilizing other additive manufacturing devices). As will be appreciated by those skilled in the relevant art(s) after reading the description herein, certain features from different aspects of the systems, methods and computer program products of the present disclosure may be combined to form yet new aspects of the present disclosure.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

What is claimed is:

1. An additive manufacturing device, the device comprising:
  a vat to hold a photocurable resin, the vat having a bottom portion including a tensioned film, the tensioned film including an image area;
  a build platform movable relative to the vat;
  an imager to selectively project curing energy into the vat at the image area to polymerize the resin and form a part in a layer-wise fashion;
  a slideable shutter located adjacent to the bottom portion;
  a recess formed in a side of the shutter adjacent to the film to allow the film to deflect downwardly freely when the shutter is in an opened position and when the shutter is in a closed position prohibiting curing energy from reaching the film wherein when the recess is under the film, as placed by the shutter, a vacuum force holding the film to the shutter is released; and
  a friction reducing element positioned between the bottom portion and the shutter and applied to the bottom portion by movement of the shutter without sliding the friction reducing element to eliminate scratching of the bottom portion by movement of at least one of the shutter and friction reducing element.

2. The device according to claim 1, wherein the slideable shutter slides between an open position and a closed position, the closed position blocking the bottom portion from curing energy from the imager.

3. The device according to claim 2, wherein the slideable shutter comprises a recess within the shutter to release a vacuum force holding the bottom portion to the shutter upon slideably moving the shutter.

4. The device of claim 1, wherein the friction reducing element is a sacrificial film connected to the bottom portion, positioned in a shutter slide path.

5. The device of claim 4, wherein the sacrificial film is dimensioned to cover the image area when the shutter is in the closed position.

6. The device of claim 4, wherein the sacrificial film is applied to the bottom portion as the shutter moves from an open position to the closed position.

7. The device of claim 6, further comprising a retaining element connected to the sacrificial film configured to, when the shutter is in the open position, separate the sacrificial film from the bottom portion.

8. The device of claim 7, wherein, when the shutter is in the open position, the retaining element is further configured to prevent blockage of curing energy by the sacrificial film.

9. The device of claim 6, wherein the retaining element is a weight connected to an end portion of the sacrificial film.

10. The device according to claim 2, wherein the shutter is constructed from optically opaque material.

11. The device according to claim 1, wherein the vat further comprises a portion to hold the bottom portion in place.

12. The device according to claim 11, further comprises a seal material to create a watertight seal at the bottom portion.

13. The device according to claim 1, wherein the curing energy is electromagnetic radiation.

14. The device according to claim 1, the shutter including a curved leading edge.

15. The device according to claim 1, the shutter including a transparent window.

16. An additive manufacturing device utilizing a photopolymer comprising:
   a vat holding photocurable resin with an image area formed by a transparent film stretched under tension;
   a build platform movable in a vertical direction above the image area;
   an image source which selectively projects light into the vat in order to polymerize the resin and form a part in a layer-wise fashion;
   a horizontally slidable shutter adjacent to the film and located between the film and the imager to provide support to the film when needed during additive manufacturing;
   a recess formed within the shutter on a side adjacent to the film to minimize a vacuum effect when a cured layer of resin is lifted by the build platform; and
   a friction reducing element positioned between the film and the shutter and applied to the bottom side of the film by movement of the shutter without sliding the friction reducing element to eliminate scratching of the bottom side by movement of at least one of the shutter and friction reducing element;
   wherein when the shutter is in an opened position the film can deflect downwardly freely and when the shutter is in a closed position curing energy is prohibited from reaching the film; and
   wherein when the recess is under the film, as placed by the shutter, a vacuum force holding the film to the shutter is released.

17. The additive manufacturing device according to claim 16, wherein the friction reducing element is a film.

18. The additive manufacturing device according to claim 16, wherein the light comprises a curing energy.

19. The additive manufacturing device according to claim 16, further comprising a retaining element connected to the friction reducing element to, when the shutter is in the open position, separate the friction reducing element from the bottom of the film and when the shutter is in the open position, the retaining element is further configured to prevent blockage of curing energy by the friction reducing element.

20. The additive manufacturing device according to claim 16, wherein the friction reducing element comprises a sacrificial film.

* * * * *